United States Patent
Nishida et al.

(10) Patent No.: US 7,440,444 B2
(45) Date of Patent: *Oct. 21, 2008

(54) IP TELEPHONE SYSTEM, IP TELEPHONE APPARATUS AND METHOD FOR IDENTIFYING DESTINATION USER

(75) Inventors: Toshiko Nishida, Kanagawa (JP); Kiyoshi Toyoda, Tokyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 344 days.

This patent is subject to a terminal disclaimer.

(21) Appl. No.: 11/183,982

(22) Filed: Jul. 19, 2005

(65) Prior Publication Data

US 2006/0023701 A1 Feb. 2, 2006

(30) Foreign Application Priority Data

Jul. 28, 2004 (JP) .......................... P2004-220536

(51) Int. Cl.
*H04L 12/66* (2006.01)
*H04M 1/00* (2006.01)
*H04M 3/00* (2006.01)

(52) U.S. Cl. ............. 370/352; 379/373.02; 379/373.03; 379/375.01

(58) Field of Classification Search ......... 370/351–356; 379/418, 373.01–376.01; 709/227–229
See application file for complete search history.

(56) References Cited

U.S. PATENT DOCUMENTS 6,694,145 B2 * 2/2004 Riikonen et al. ............ 455/502
7,031,453 B1 * 4/2006 Busardo ................ 379/373.02
7,161,933 B2 * 1/2007 Stanford ..................... 370/352

(Continued)

FOREIGN PATENT DOCUMENTS

EP 1263204 12/2002

(Continued)

OTHER PUBLICATIONS

P. Faltstrom, Cisco Systems Inc: "E.164 number and DNS; rfc2916.txt" IETF Standard, Internet Engineering Task Force, IETF, CH, Sep. 2000, XP015008699.

(Continued)

*Primary Examiner*—Ahmad F. Matar
*Assistant Examiner*—Sonia Gay
(74) *Attorney, Agent, or Firm*—Greenblum & Bernstein, P.L.C.

(57) ABSTRACT

An IP telephone system includes a source IP telephone apparatus, a destination telephone apparatus, a Web server and an ENUM server. The IP telephone apparatuses are connected to an IP network. The Web server stores ring tone information corresponding to a telephone number assigned to the source or destination IP telephone apparatus. The ENUM server stores a NAPTR resource record in which a URI specifies link data related to the ring tone information stored in the Web server. In the IP telephone system, the IP telephone apparatus that has received a call transmits, to the ENUM server, a query for a NAPTR record corresponding to an intended recipient's telephone number. The IP telephone apparatus then transmits, to the Web server, a request for the ring tone information corresponding to the intended recipient's telephone number according to the obtained NAPTR resource record, and sounds a ring tone according to the obtained ring tone information

11 Claims, 16 Drawing Sheets

U.S. PATENT DOCUMENTS

| | | | |
|---|---|---|---|
| 7,233,658 B2 * | 6/2007 | Koser et al. | 379/373.01 |
| 2002/0181694 A1 | 12/2002 | Mani | |
| 2004/0109558 A1 * | 6/2004 | Koch | 379/373.01 |
| 2005/0182781 A1 * | 8/2005 | Bouvet | 707/102 |

FOREIGN PATENT DOCUMENTS

| | | |
|---|---|---|
| JP | 2003-188992 | 7/2003 |
| KR | 19990086215 | 12/1999 |
| KR | 20000006974 | 2/2000 |
| KR | 20040028333 | 4/2003 |
| WO | 01/41416 | 6/2001 |
| WO | 01/45358 | 6/2001 |

OTHER PUBLICATIONS

P. Faltstorm Cisco Systems, et al: "The E. 164 to Uniform Resource Identifiers (URI) Dynamic Delegation Discovery System (DDDS) Application (ENUM); rfc3761. txt; "IETF Standard, Internet Engineering Task Force, IETF, CH, Apr. 2004, XP015009541.

English Language Abstract of JP 2003-188992.

ENUM Trial Japan, "ENUM Trial Japan First Report," May 2004, together with a partial English translation of the same.

U.S. Appl. No. 11/183,966 to Toshiko Nishida et al., filed Jul. 19, 2005.

U.S. Appl. No. 11/183,977 to Toshiko Nishida et al., filed Jul. 19, 2005.

U.S. Appl. No. 11/183,962 to Toshiko Nishida et al., filed Jul. 19, 2005.

U.S. Appl. No. 11/183,868 to Toshiko Nishida et al., filed Jul. 19, 2005.

English language Abstract of Korea 2004-0028333.

English language Abstract of Korea 2000-0006974.

* cited by examiner

Fig.3

| Telephone number | URI |
|---|---|
| 05012341111 | taro@tokyo.sip.jp |
| 05012342222 | hanako@tokyo.sip.jp |

Fig.6

| Enum domain name | | Order | Preference | Flags | Service | | URI scheme | |
|---|---|---|---|---|---|---|---|---|
| | | | | | | | URI | |
| 1.1.1.1.4.3.2.1.0.5.1.8.e164.arpa | IN NAPTR | 100 | 10 | "u" | "E2U+sip" | "!^.*$!sip:" | taro@tokyo.sip.jp " | |
| | IN NAPTR | 100 | 10 | "u" | "E2U+http" | "!^.*$!http:" | //www.tokyo.sip.com/user taro.html " | |
| 2.2.2.2.4.3.2.1.0.5.1.8.e164.arpa | IN NAPTR | 100 | 10 | "u" | "E2U+sip" | "!^.*$!sip:" | hanako@tokyo.sip.jp " | |
| | IN NAPTR | 100 | 10 | "u" | "E2U+http" | "!^.*$!http:" | //www.tokyo.sip.com/user hanako.html " | |

NAPTR resource record

Fig.7

| URI | IP address |
|---|---|
| taro@tokyo.sip.jp | 192.168.1.1 |
| hanako@tokyo.sip.jp | 192.168.1.2 |
| jiro@tokyo.sip.jp | 192.168.1.3 |
| yoshiko@tokyo.sip.jp | 192.168.1.4 |

Fig.8

| URL(URI) | Telephone number | User name | Ring melody |
|---|---|---|---|
| http://www.tokyo.sip.com/user taro.html | 05012341111 | taro | Pictures at an Exhibition |
| http://www.tokyo.sip.com/user hanako.html | 05012342222 | hanako | Polonaise |

Fig.10

INVITE sip:taro@tokyo.sip.jp SIP/2.0
Via:SIP/2.0/UDP Tokyo.sip.jp:5060;branch=z9hG4bk776as3
From:jiro@tokyo.sip.jp;tag=r18f061962
To:taro@tokyo.sip.jp

Fig.13

| Telephone number | URI | User name | Ring melody |
|---|---|---|---|
| 05012341111 | taro@tokyo.sip.jp | taro | Pictures at an Exhibition |
| 05012342222 | hanako@tokyo.sip.jp | hanako | Polonaise |

Fig.14

| Enum domain name | | Order | Preference | Flags | Service | | URI scheme | |
|---|---|---|---|---|---|---|---|---|
| | | | | | | | | URI |
| 1.1.1.1.4.3.2.1.0.5.1.8.e164.arpa | IN NAPTR | 100 | 10 | "u" | "E2U+sip" | "!^.*$!sip:" | | taro@tokyo.sip.jp" |
| 2.2.2.2.4.3.2.1.0.5.1.8.e164.arpa | IN NAPTR | 100 | 10 | "u" | "E2U+sip" | "!^.*$!sip:" | | hanako@tokyo.sip.jp" |

NAPTR resource record

IP TELEPHONE SYSTEM, IP TELEPHONE APPARATUS AND METHOD FOR IDENTIFYING DESTINATION USER

BACKGROUND OF THE INVENTION

1. Field of the Invention

The present invention relates to an IP telephone system, an IP telephone apparatus and a method for identifying destination user.

2. Description of Related Art

The recent rapid growth of the Internet has drawn attention to an IP telephone system that enables low-cost voice communications with telephone apparatuses at remote places as well as free voice communications between IP telephone apparatuses owned by subscribers. Among such IP telephone systems, there is a proposal for an IP telephone system that allows the transmitting party to specify a screen display or ring tone on the receiving party's end for the purpose of improving user convenience (See Prior Art 1, for example).

On the other hand, as an underlying technology, ENUM is emerging as the focus of attention, enabling communications according to individual user circumstances by effectively controlling information used for various communications tools including telephones, facsimiles, mobile phones and electronic mails. ENUM is designed to identify the Internet service with a unique global identification number such as the E. 164 number, using the DNS (Domain Name Server). Currently, the IETF (Internet Engineering Task Force) is seeking to standardize ENUM platforms, where protocol specifications are discussed (See Publication 1, for example).

[Related Art 1] Japanese Laid Open Publication 2003-188992

[Publication 1] Issued by ENUM Trial Japan "ENUM Trial Japan First Report" May, 2004

However, the above-described conventional IP telephone system only allows the transmitting party to specify, according to the caller's setting, an operation performed on the receiving party's end, such operations relating to the screen display or the ring tone when a call is received. The conventional IP telephone system is not capable of specifying operations according to a call recipient's individual setting.

In general, IP telephone apparatuses used in homes or companies are shared by a plurality of users. For a shared IP telephone apparatus, when a user picks up a call intended for another user, it becomes necessary to call the intended user to the telephone. In such a telephone system, user convenience can be improved when the intended user can be identified before the telephone is picked up so that picking up and passing of the telephone to the intended recipient can be avoided.

SUMMARY OF THE INVENTION

The present invention is provided to address the above-described problems. The purpose of the present invention is to provide an IP telephone system, an IP telephone apparatus and a method for identifying the destination user so that the destination user can be identified before the phone is picked up.

The IP telephone system according to the present invention includes an IP telephone apparatus, a Web server and an ENUM server. The IP telephone apparatus is connected to an IP network. The Web server stores ring tone information corresponding to the telephone number that is assigned to the IP telephone apparatus. The ENUM server stores a NAPTR resource record in which a URI specifies link data related to ring tone information, which is stored in the Web server. In the IP telephone system, the IP telephone apparatus that has received a call transmits, to the ENUM server, a query for a NAPTR resource record corresponding to the intended recipient's telephone number. The IP telephone apparatus then transmits, to the Web server, a request for the ring tone information corresponding to the intended recipient's telephone number, according to the obtained NAPTR resource record, and sounds a ring tone according to the obtained ring tone information.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein:

FIG. 3 illustrates an example of a table stored in a FROM of the IP telephone apparatus according to the first embodiment;

FIG. 6 illustrates an example of a NAPTR record stored in a DB of the ENUM server according to the first embodiment;

FIG. 7 illustrates an example of data stored in a DB of a DNS server according to the first embodiment;

FIG. 8 illustrates an example of data stored in a DB of a Web server according to the first embodiment;

FIG. 10 illustrates an example of the message "INVITE" transmitted from the source IP telephone apparatus to the destination IP telephone apparatus in the IP telephone system according to the first embodiment;

FIG. 13 illustrates an example of data stored in a ring tone information table of the IP telephone apparatus according to the second embodiment;

FIG. 14 illustrates an example of a NAPTR record stored in a DB of an ENUM server according to the second embodiment;

DETAILED DESCRIPTION OF PREFERRED EMBODIMENTS

The embodiments of the present invention are explained in the following in reference to the above-described drawings.

First Embodiment

Figure 1:
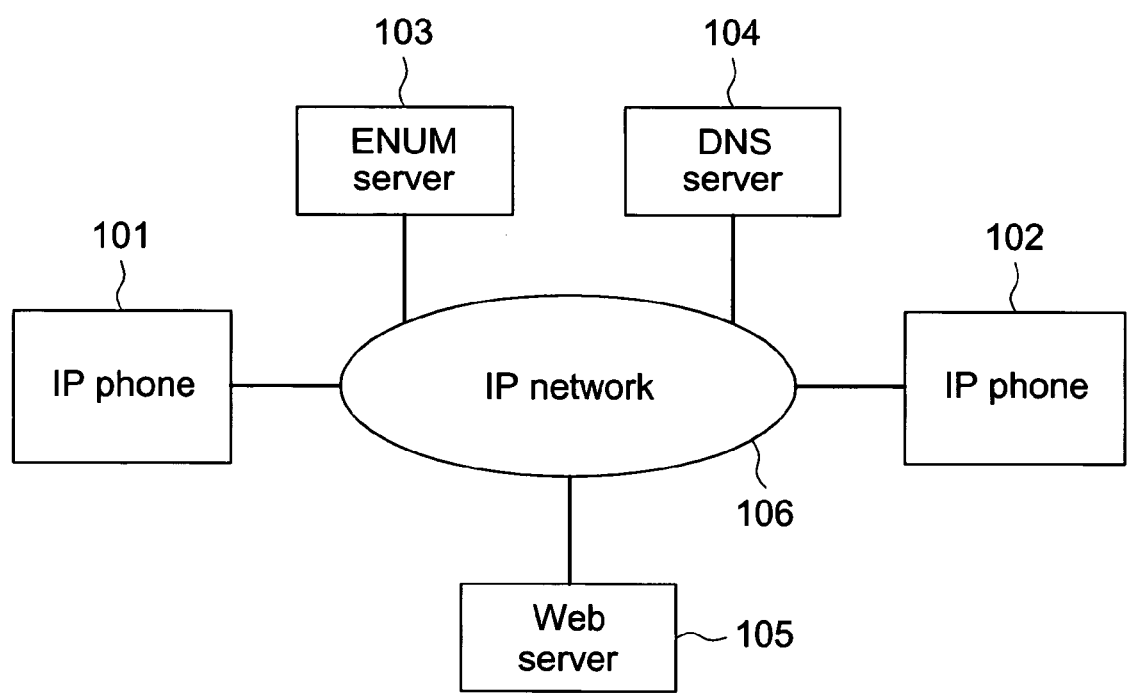
FIG. 1 illustrates a network configuration to which an IP telephone system according to the first embodiment of the present invention is applied.

FIG. 1 illustrates a network configuration to which the IP telephone system according to the first embodiment of the present invention is applied.

As shown in FIG. 1, a plurality of IP telephone apparatuses (hereafter referred to as "IP phone") 101 and 102, ENUM server 103, DNS server 104 and Web server 105 are mutually connected via IP network 106 in the IP telephone system according to the embodiment. Also, the IP telephone system is not limited to this embodiment and may be configured to connect three or more IP phones in IP network 106.

IP phone 101 (102) has a function enabling voice communication with another IP phone via IP network 106. IP phone 101 (102) also has a function allowing users to access Web server 105 according to the http protocol and read HTML texts provided by Web server 105.

Particularly, IP phone 102 is shared by a plurality of users. IP phone 102 also has telephone numbers assigned to each user. The following describes a case where IP phone 102 is shared by two users.

ENUM server 103 is equipped with a database (DB) that stores a NAPTR resource record (hereafter referred to as "NAPTR record"), which is described later. ENUM server 103 transmits, to IP phone 101 (102), a NAPTR record stored in the DB in response to a query from IP phone 101 (102).

DNS server 104 is equipped with a DB that stores a URI specified in a NAPTR record and an IP addresses corresponding to the URI. DNS server 104 transmits, to IP phone 101 (102), an IP address stored in the DB in response to a query from IP phone 101 (102).

Web server 105 is equipped with a DB that stores an information specifying ring tone corresponding to each telephone number that is assigned to IP phone 101 (102) (hereafter referred to as "ring tone information"), the IP phone 101 being connected to IP network 106. The ring tone information stored in the DB is, for example, registered by the IP phone 101 (102) user via IP network 106. The ring tone information can also be registered by the IP telephone service administrator at the request of the user. Web server 105 transmits, to IP phone 101 (102), the ring tone information stored in the DB in response to a request from IP phone 101 (102) that has received a call.

Figure 2:
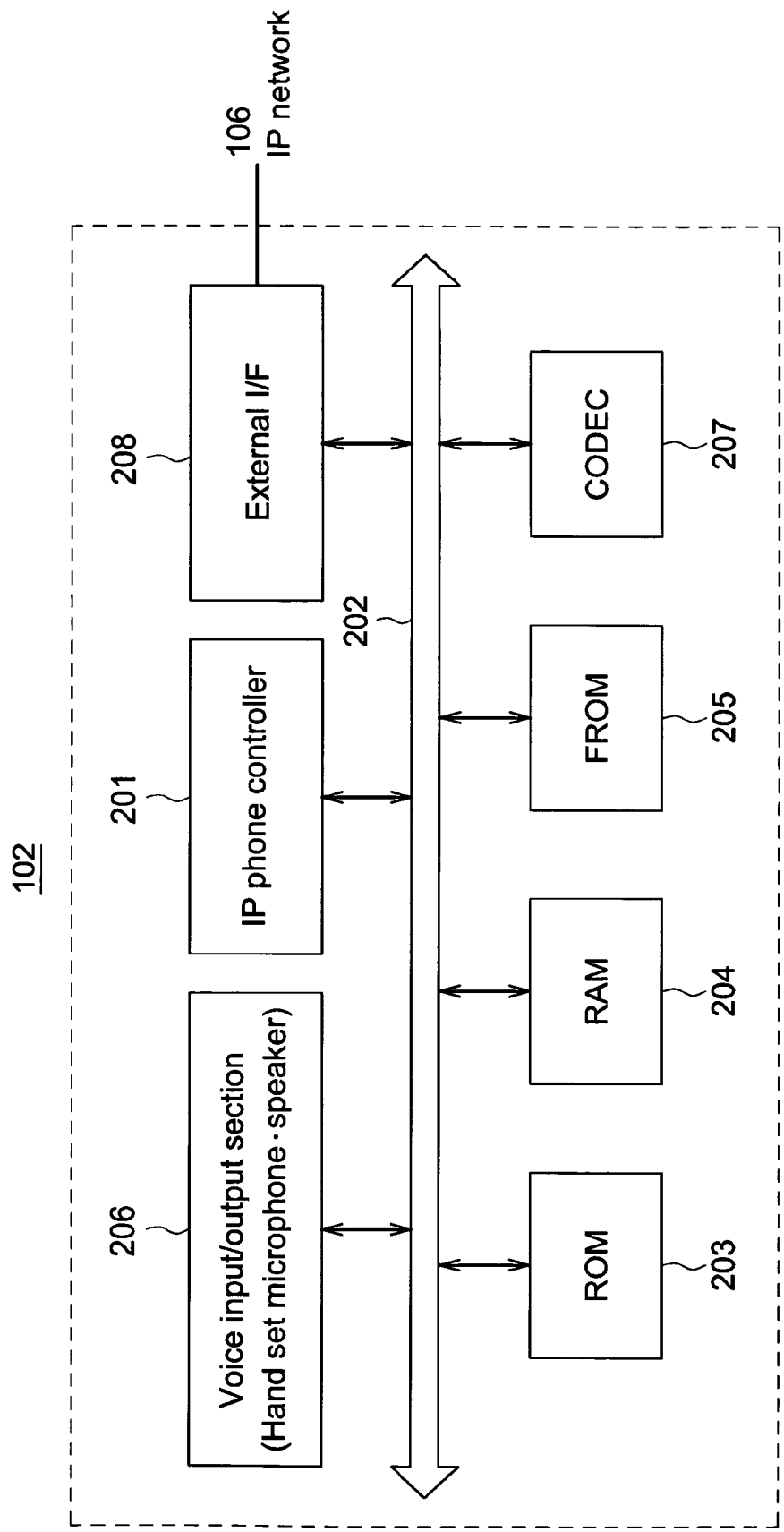
FIG. 2 illustrates a block diagram describing a configuration of the IP telephone apparatus that constitutes the IP telephone system according to the first embodiment.

FIG. 2 illustrates a block diagram describing a configuration of IP phone 102 according to the embodiment of the present invention. IP phone 101 has the same configuration as IP phone 102.

IP phone 102 shown in FIG. 2 includes IP phone controller 201 that controls the entire operation of the apparatus. ROM 203, RAM 204 and FROM 205 are connected to IP phone controller 201 via bus 202. Also, voice input/output section 206, CODEC 207 and external interface (I/F) 208 are connected to IP phone controller 201 via bus 202.

IP phone controller 201 executes the following control operation using a control program stored in ROM 203. During this execution, IP phone controller 201 utilizes RAM 204 as a work area.

IP phone controller 201 controls all operations needed to perform voice communication via IP network 106. For example, IP phone controller 201 executes a call control operation with the destination terminal according to call control protocols such as SIP or H.323.

IP phone controller 201 controls the transmission, to ENUM server 103, of a query for a NAPTR record corresponding to the destination terminal and the reception of a response to the query. IP phone controller 201 also controls transmission, to DNS server 104, of a query for an IP address and the reception of a response to the query.

Furthermore, IP phone controller 201 controls access to Web server 105 and a reading of HTML texts provided by Web server 105.

FROM 205 stores address book data used to specify a destination when a call is made from the apparatus. FROM 205 also stores a table that registers telephone numbers and their corresponding URIs when a plurality of telephone numbers are assigned.

FIG. 3 shows an example of a table stored in FROM 205. FIG. 3 shows a case where two telephone numbers are assigned to IP phone 102. In the FIG. 3 table, FROM 205 stores URI "taro@tokyo.sip.jp" corresponding to telephone number "05012341111". Similarly, FROM 205 stores URI "hanako@tokyo.sip.jp" corresponding to telephone number "05012342222".

Voice input/output section 206 receives a user's voice from IP phone 102 and makes a voice output to the user. Voice input/output section 206 is configured with a handset microphone as the voice input section and with a speaker as the voice output section.

CODEC 207 converts analog data input from voice input/output section 206 into digital data. CODEC 207 also converts digital data input from IP network 106 into analog data. CODEC 207 encodes the voice data and executes a compress/decompress operation with the voice data.

External I/F 208 functions as an interface to IP network 106 to which IP phone 102 is connected.

Figure 4:
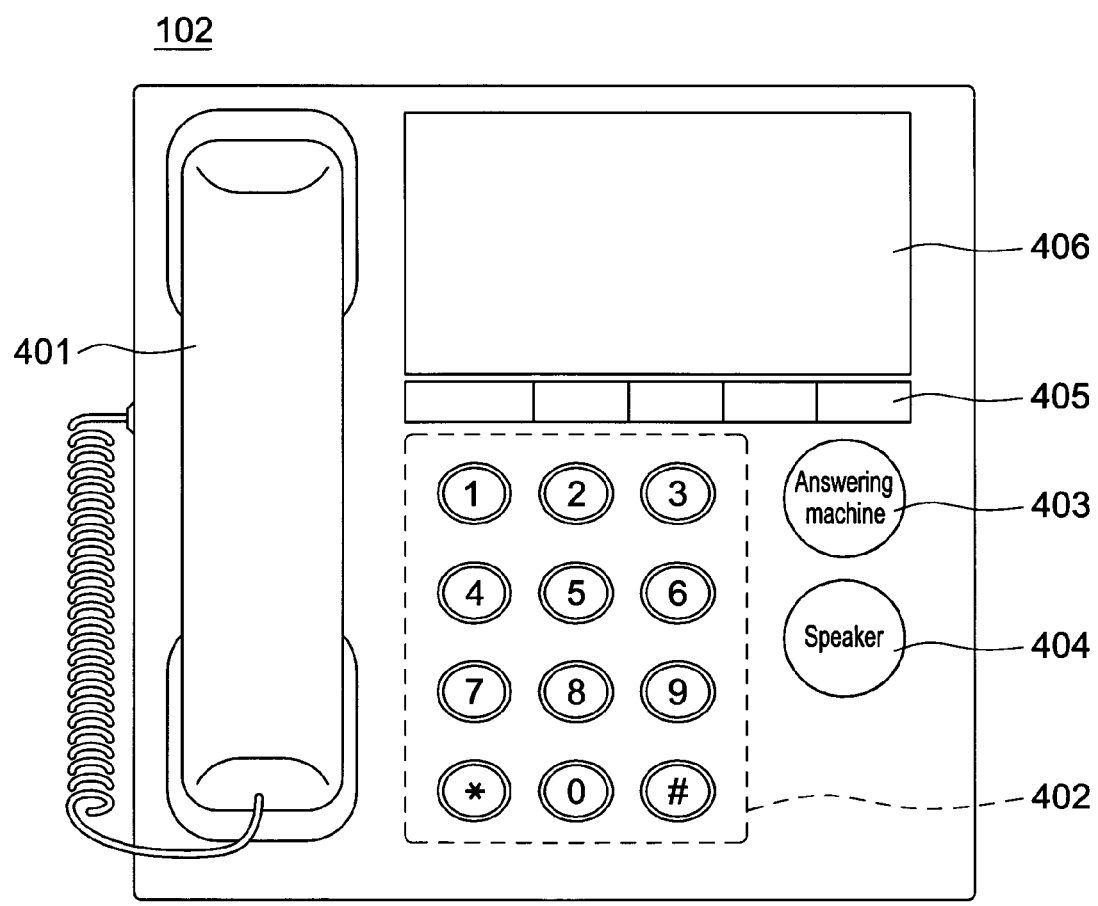
FIG. 4 illustrates the external front view of the IP telephone apparatus according to the first embodiment.

FIG. 4 shows the external front view of IP phone 102 according to the embodiment of the present invention. IP phone 101 has the same configuration as IP phone 102.

As shown in FIG. 4, IP phone 102 is equipped with receiver 401 that receives the operator's voice. IP phone 102 is also equipped with numerical keys 402 through which telephone numbers and the like are input. To the right side of numerical keys 402 are AM (Answering Machine) button 403 and speaker button 404. AM button 403 is used to switch to the answering machine mode. Speaker button 404 is used to switch the voice output mode to external.

Function button 405 is located above numerical keys 402 and is able to set various functions such as a single touch function which enables a single touch transmission. Display 406 is located above function button 405. Display 406 is configured with an LCD and the like. Display 406 displays, for example, the current status of the apparatus or information regarding the call destination.

Figure 5:
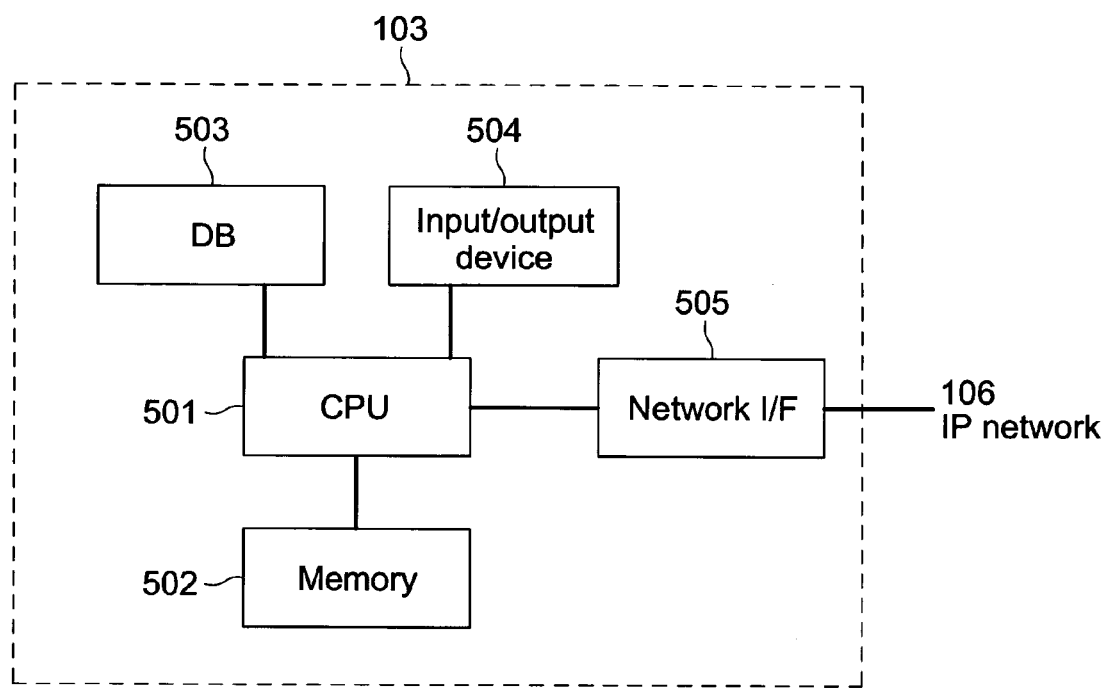
FIG. 5 illustrates a block diagram describing a typical configuration of an ENUM server according to the first embodiment.

FIG. 5 illustrates a block diagram describing a typical configuration of ENUM server 103 in the IP telephone system according to the embodiment of the present invention. DNS server 104 and Web server 105 in the IP telephone system according to the embodiment of the present invention have the same configuration except they have different data in their DBs.

As shown in FIG. 5, ENUM server 103 includes CPU 501 that controls the entire operation of the server. Memory 502 is connected to CPU 501. Memory 502 has ROM and RAM functions. The ROM stores the ENUM server 103 control program which CPU 501 retrieves and executes. The RAM functions as a work memory when CPU 501 executes the control program.

Database (DB) 503 is connected to CPU 501. DB 503 stores a NAPTR record, which is described later. When receiving a query for a NAPTR record from IP phone 101, for example, CPU 501 searches for a corresponding NAPTR record among the data stored in DB 503, and transmits the corresponding NAPTR record to IP phone 101.

Furthermore, input/output device 504 is connected to CPU 501. Input/output device 504 is configured with an input device such as a keyboard and an output device such as a display. The input device is used to add and edit the data stored in DB 503. The output device is used by an administrator of ENUM server 103 to confirm the data stored in DB 503.

Network interface (I/F) 505 is connected to CPU 501. Network I/F 505 is an interface to IP network 106 to which ENUM server 103 is connected.

FIG. 6 shows an example of a NAPTR record stored in DB 503 of ENUM server 103 according to the embodiment of the present invention. FIG. 6 shows an example where DB 503 stores NAPTR records corresponding to domain names obtained from telephone numbers "05012341111" and "05012342222".

In FIG. 6, URIs "taro@tokyo.sip.jp" and "//www.tokyo.sip.com/usertaro.html" correspond to domain name "1.1.1.1.4.3.2.1.0.5.1.8.e164.arpa" obtained from telephone number "05012341111". The service field of the first URI specifies "E2U+sip", which indicates that the terminal specified by "05012341111" is able to perform under the SIP protocol. The service field of the second URI specifies "E2U+http", which indicates that the terminal specified by "05012341111" is able to perform under the http protocol.

URIs "hanako@tokyo.sip.jp" and "//www.tokyo.sip.com/userhanako.html" correspond to domain name "2.2.2.2.4.3.2.1.0.5.1.8.e164.arpa" obtained from telephone number "05012342222". The service field of the first URI specifies "E2U+sip", which indicates that the terminal specified by "05012342222" is able to perform under the SIP protocol. The service field of the second URI specifies "E2U+http", which indicates that the terminal specified by "05012342222" is able to perform under the http protocol.

FIG. 7 illustrates an example of data stored in a DB of DNS server 104 according to the embodiment of the present invention.

FIG. 7 shows a case where the DB of DNS server 104 stores IP addresses corresponding to URIs "taro@tokyo.sip.jp", "hanako@tokyo.sip.jp", "jiro@tokyo.sip.jp" and "yoshiko@tokyo.sip.jp". More specifically, IP addresses "192.168.1.1", "192.168.1.2", "192.168.1.3" and "192.168.1.4" correspond to URIs "taro@tokyo.sip.jp", "hanako@tokyo.sip.jp", "jiro@tokyo.sip.jp" and "yoshiko@tokyo.sip.jp" respectively.

FIG. 8 illustrates an example of data stored in a DB of Web server 105 according to the embodiment of the present invention. In an actual use, the data shown in FIG. 8 is described, for example, in HTML (Hypertext Markup Language).

FIG. 8 shows a case where the DB of Web server 105 stores telephone numbers, user names and ring tones (melodies) corresponding to URIs (URLs) "//www.tokyo.sip.com/usertaro.html" and "//www.tokyo.sip.com/userhanako.html". More specifically, the DB stores telephone number "05012341111", user name "taro" and ring melody "Pictures at an Exhibition" corresponding to URI (URL) "//www.tokyo.sip.com/usertaro.html". Similarly, the DB stores telephone number "05012342222", user name "hanako" and ring melody "Polonaise" corresponding to URI "//www.tokyo.sip.com/userhanako.html".

Figure 9:
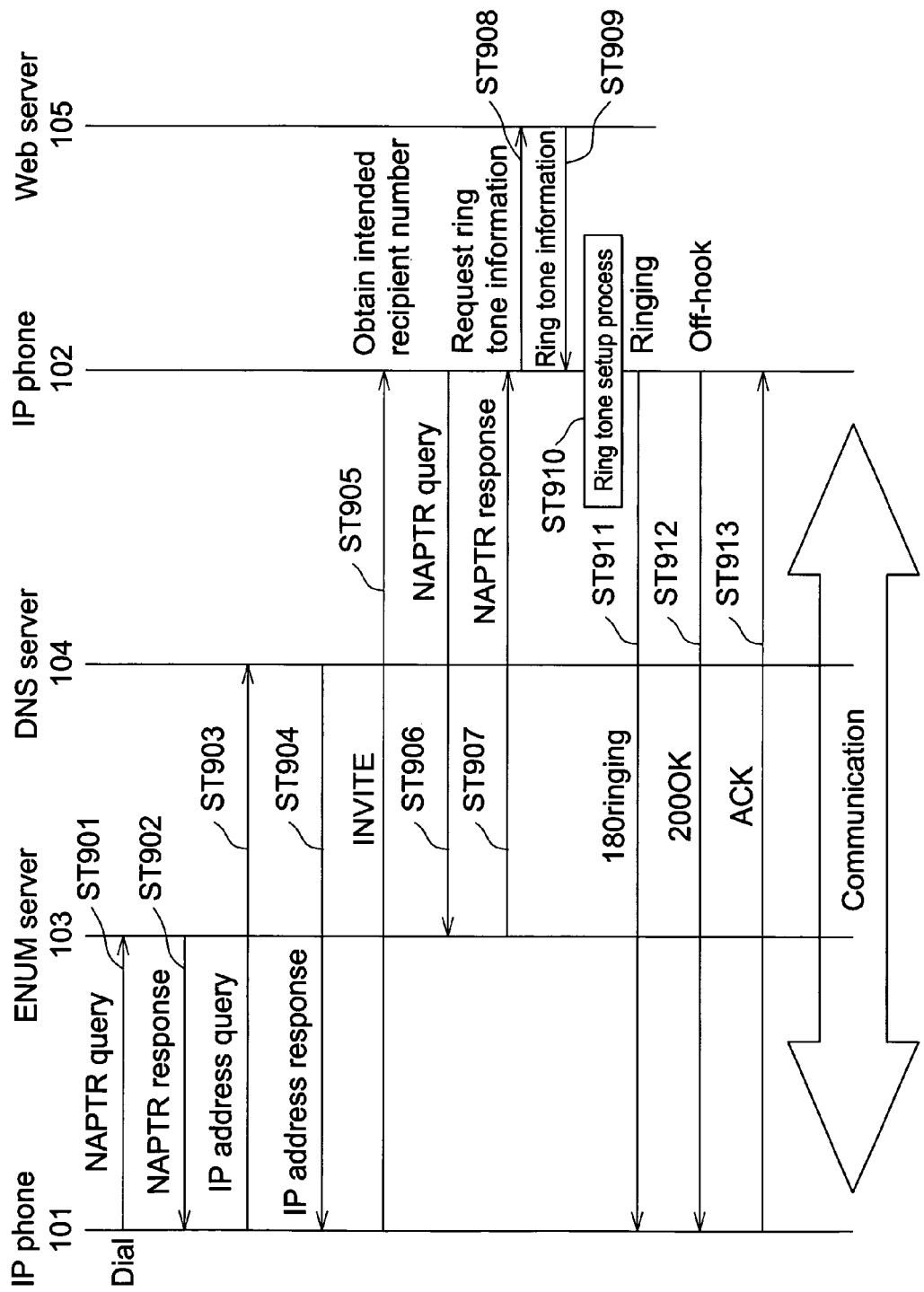
FIG. 9 illustrates a sequence diagram describing operations performed until a source IP telephone apparatus performs voice communication with a destination IP telephone apparatus in the IP telephone system according to the first embodiment.

The following describes, with reference to the FIG. 9 sequence, the operations performed until IP phone 101 performs voice communication with IP phone 102 in the IP telephone system according to the embodiment of the present invention.

In this illustration, DB 503 of ENUM server 103 stores the NAPTR record shown in FIG. 6. The DB of DNS server 104 stores the data shown in FIG. 7. The DB of Web server 105 stores the data shown in FIG. 8. Telephone numbers "05012341111" and "05012342222" are assigned to IP phone 102.

When performing voice communication with IP phone 102, IP phone 101 receives, from the user, one of the telephone numbers assigned to IP phone 102. In this example, telephone number "05012341111" is input, this telephone number being among those for IP phone 102. Upon receiving the input telephone number, IP phone 101 transmits, to ENUM server 103, a query for a NAPTR record corresponding to the telephone number (ST 901). In the following, this NAPTR record query is referred to as a "NAPTR query".

In this example, IP phone 101 first converts the operator's input number "05012341111" into "+81-5-012341111" including the country code according to standard E. 164. Then, "+815012341111" is obtained, maintaining + at the beginning and also maintaining the numbers. Then, non numerical symbols are deleted, and dots are inserted between the numbers, resulting in "8.1.5.0.1.2.3.4.1.1.1.1". Next, the numbers are reversed, and data string e164.arpa is added at the end. As a result, domain name "1.1.1.1.4.3.2.1.0.5.1.8.e164.arpa" is obtained. IP phone 101 then transmits the NAPTR query for the data string.

Upon receiving the NAPTR query, ENUM server 103 searches for a NAPTR record corresponding to domain name "1.1.1.1.4.3.2.1.0.5.1.8.e164.arpa". ENUM server 103 then transmits, to IP phone 101, a response including the NAPTR record (ST 902). In the following, a response including a NAPTR record is referred to as a "NAPTR response". In this example, ENUM server 103 retrieves the upper NAPTR record, among the NAPTR records shown in FIG. 6 and transmits, to IP phone 101, a response including the NAPTR record.

Upon receiving the NAPTR response, IP phone 101 transmits, to DNS server 104, a query for the IP address corresponding to URI "taro@tokyo.sip.jp". The URI specified in the NAPTR record indicates that the destination terminal is able to perform under the SIP protocol (ST 903). In the following, this IP address query is referred to as an "IP address query".

Upon receiving the IP address query, DNS server 104 searches for the IP address corresponding to the URI and transmits, to IP phone 101, an IP address response including the IP address (ST 904). In this example, DNS server 104 retrieves the top IP address "192.168.1.1" shown in FIG. 7 and transmits, to IP phone 101, a response including the IP address. In the following, a response including this IP address is referred to as an "IP address response".

Upon receiving the IP address response, IP phone 101 confirms an IP address assigned to one of the IP phone 102 telephone numbers, the IP phone number being specified by the user. IP phone 101 then transmits the message "INVITE" to the IP address destination (ST 905).

The following describes an example of the message "INVITE" transmitted from IP phone 101 to IP phone 102.

FIG. 10 shows an example of the message "INVITE" transmitted from IP phone 101 to IP phone 102.

As shown in FIG. 10, the message "INVITE" contains header "From" in the third line and header "To" in the forth line. Header "From" specifies URI "jiro@tokyo.sip.jp" corresponding to the telephone number of the source IP phone 101. Header "To" specifies URI "taro@tokyo.sip.jp" corresponding to the telephone number of the destination IP phone 102. The data in header "From" and header "To" is not limited to the one shown in FIG. 10.

Upon receiving the message "INVITE" from IP phone 101, IP phone 102 obtains, from the URI specified in header "To", a telephone number specified as the recipient telephone number (hereafter referred to as an "intended recipient number"). More specifically, IP phone 102 obtains an intended recipient number by searching for one of the telephone numbers in the table stored in FROM 205, according to the URI specified in header "To". In this example, IP phone 102 obtains, as the intended recipient number, telephone number "05012341111" corresponding to URI "taro@tokyo.sip.jp", which is specified in header "To".

IP phone 102 then transmits, to ENUM server 103, the NAPTR query for the intended recipient number in the same manner as IP phone 101 after receiving the input telephone number (ST 906). More specifically, IP phone 102 first converts the operator's input number "05012341111" into "+81-5-012341111" including the country code according to standard E.164. Then, "+8151012341111" is obtained, maintaining + at the beginning and the numbers. Then, non numerical symbols are deleted, and dots are inserted between the numbers, resulting in "8.1.5.0.1.2.3.4.1.1.1.1". Next, the numbers are reversed, and data string e164.arpa is added at the end. As a result, domain name "1.1.1.1.4.3.2.1.0.5.1.8.e164.arpa" is obtained. IP phone 102 then transmits, to ENUM server 103, the NAPTR query for the data string.

Upon receiving the NAPTR query, ENUM server 103 searches for a NAPTR record corresponding to domain name "1.1.1.1.4.3.2.1.0.5.1.8.e164.arpa" and transmits, to IP phone 102, a response including the NAPTR record (ST 907). In this example, ENUM server 103 retrieves the upper NAPTR record among the NAPTR records shown in FIG. 6 in the same process as ST 902 and transmits, to IP phone 102, the NAPTR response including the NAPTR record.

Upon receiving the NAPTR response, IP phone 102 requests the ring tone information by accessing Web server 105, based on URI "//www.tokyo.sip.com/usertaro.html". The URI specified in the NAPTR record indicates that the destination terminal is able to perform under the http protocol (ST 908).

Upon receiving a request for the ring tone information, Web server 105 searches for the ring tone information corresponding to the request, and transmits the ring tone information to IP phone 102 (ST 909). In this example, among the data shown in FIG. 8, Web server 105 transmits "Pictures at an Exhibition" as the ring tone information.

Upon obtaining the ring tone information, IP phone 102 performs a process to setup the obtained ring tone as a ring tone (hereafter referred to as a "ring tone setup process") (ST 910). After the ring tone setup process is performed, IP phone 102 sounds the ringing tone. In this example, IP phone 102 sounds the obtained "Pictures at an Exhibition". At the same time, IP phone 102 transmits the message "180 Ringing" to IP phone 101 (ST 911).

When an off-hook condition is detected at IP phone 102, IP phone 102 transmits, to IP phone 101, the "200 OK" message indicating a connection approval (ST 912). Upon receiving the "200 OK" message, IP phone 101 transmits the "ACK" message to IP phone 102 (ST 913). Once IP phone 102 receives the "ACK" message, voice communication becomes possible between IP phone 101 and IP phone 102. After this, IP phone 101 outputs the voice, after which voice communication is performed. As described above, IP phone 101 performs these operations until voice communication with IP phone 102 is performed.

Figure 11:
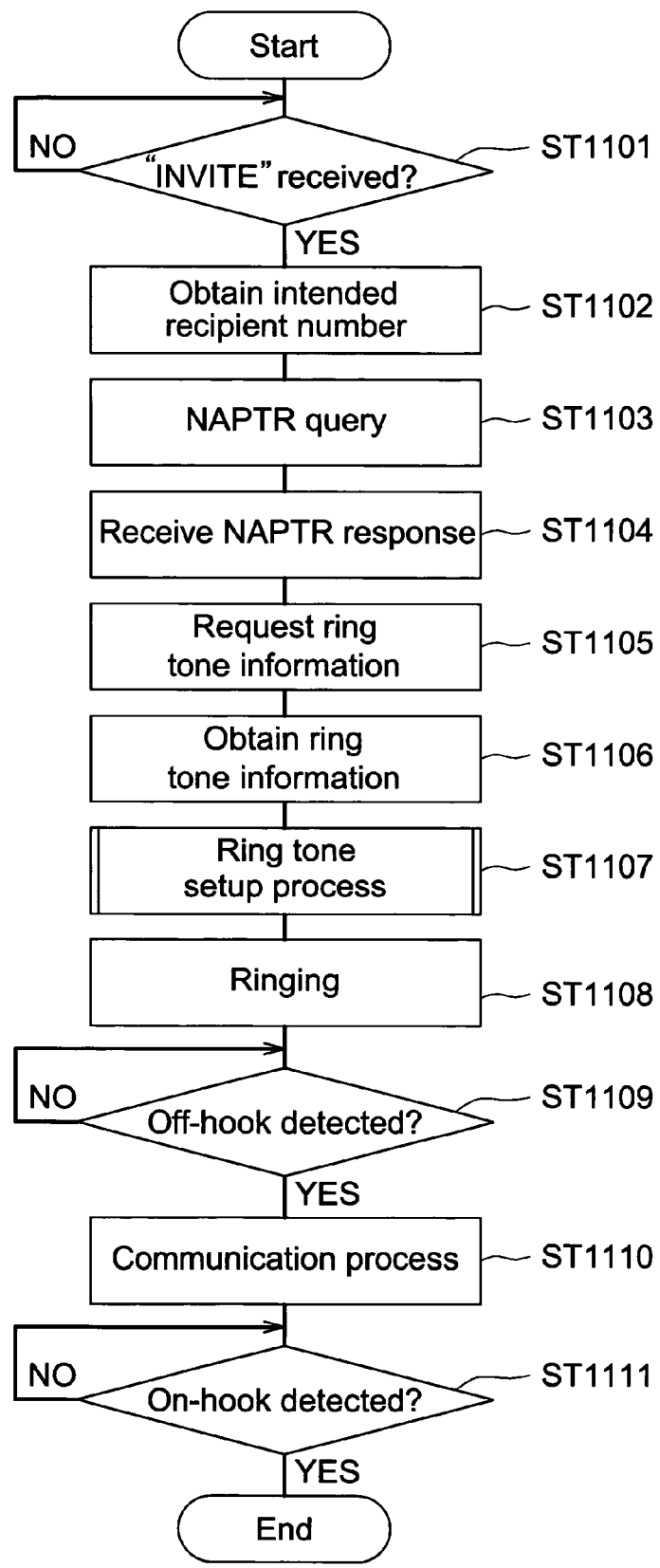
FIG. 11 illustrates a flow chart describing an operation of the destination IP telephone in the FIG. 9 sequence.

FIG. 11 is a flow chart illustrating an operation of the destination IP phone 102 in the FIG. 9 sequence.

IP phone 102 monitors, in a standby state, for the reception of the message "INVITE" via IP network 106 (ST 1101). When the message "INVITE" is received, IP phone 102 obtains, through the above-described operation, an intended recipient number from header "To" of the message "INVITE" (ST 1102).

After obtaining the intended recipient number, IP phone 102 transmits, to ENUM server 103, the NAPTR query for the intended recipient number (ST 1103). In response to the query, ENUM server 103 transmits the NAPTR response, and IP phone 102 receives that NAPTR response (ST 1104).

Upon receiving the NAPTR response, IP phone 102 accesses Web server 105 based on the URI (URL) specified in the NAPTR record, among the NAPTR records included in the NAPTR response, the record indicating that the destination terminal is able to perform under the http protocol, and requests the ring tone information (ST 1105). In response to the request, Web server 105 transmits the ring tone information, and IP phone 102 receives this ring tone information. Thereby IP phone 102 obtains the ring tone information (ST 1106).

After the ring tone information is obtained, IP phone 102 performs the ring tone setup process (ST 1107). After the ring tone setup process is performed, IP phone 102 sounds a ringing tone (ST 1108). At the same time, IP phone 102 transmits the message "180 Ringing". While the message "180 Ringing" is transmitted, IP phone 102 determines whether the off-hook condition is detected at the user side (ST 1109). ST 1109 is repeated until the off-hook condition is detected.

When the off-hook condition is detected, IP phone 102 transmits, to the source IP phone 101, the message "200 OK" indicating a connection approval. Upon receiving the message "ACK" transmitted from IP phone 101 in response to the message "200 OK", IP phone 102 performs a communication process (ST 1110).

In the communications process, IP phone 102 determines whether the on-hook condition is detected at the user side, while outputting voice data transmitted from IP phone 101 (ST 1111). When the on-hook condition is detected, IP phone 102 terminates the communications process. ST 1111 is repeated until the on-hook condition is detected.

As described above, in the IP telephone system according to the embodiment of the present invention, the destination IP phone 102 has been assigned a plurality of telephone numbers. The source IP phone 101 specifies a telephone number and initiates transmission. After receiving the NAPTR response corresponding to this telephone number, the source IP phone 101 transmits, to the destination IP phone 102, the message "INVITE". The destination IP phone 102 obtains the intended recipient number from the message "INVITE". Then, after receiving the NAPTR response corresponding to the intended recipient number, the destination IP phone 102 transmits, to Web server 105, a request for ring tone information. When the ring tone information is obtained, IP phone 102 performs the ring tone setup process and sounds the ring tone contained in the ring tone information. Accordingly, the destination IP phone 102 sounds a ring tone according to the telephone number specified by the source IP phone 101. Therefore, the IP phone 102 user can identify the destination user by the ring tone, and thus, can identify the destination user before picking up the phone.

Particularly, in the IP telephone system according to the embodiment of the present invention, Web server 105 transmits the ring tone information corresponding to the intended recipient number, according to the http protocol, in response to a request from the destination IP phone 102. Accordingly, the ring tone information corresponding to the intended recipient number can be obtained by executing a call control process according to the http protocol.

In the IP telephone system according to the embodiment of the present invention, the destination IP phone 102 obtains the intended recipient number based on the received message "INVITE". More specifically, IP phone 102 obtains, as the intended recipient number, the telephone number corresponding to the URI specified in the message "INVITE". Accordingly, IP phone 102 can obtain the intended recipient number in the call control process performed according to the SIP protocol.

In the embodiment of the present invention, the source IP phone transmits, to DNS server 104 provided on IP network 106, the IP address query and transmits the message "INVITE" according to the obtained IP address. However, the embodiment is not limited to this example. A CA (Call Agent) that functions as a SIP server may be provided on IP network 106 so that the message "INVITE" can be transmitted by specifying the telephone number of the destination terminal.

In the embodiment of the present invention, URIs are specified in header "From" and header "To" of the message "INVITE". However, the embodiment is not limited to this example. Telephone numbers can be used instead of URIs. In this case, it is possible to skip the process of obtaining an intended recipient number with reference to the table in FROM 205 by extracting a telephone number as the intended recipient number.

In the embodiment of the present invention, the destination IP phone 102 obtains, from Web server 105, the ring tone information according to the http protocol. However, the method of obtaining the ring tone information is not limited to obtaining, from Web server 105, the ring tone information according to the http protocol. For example, the ring tone information can be obtained from a DB server provided separately, using LDAP (Lightweight Directory Access Protocol) or FTP (File transfer Protocol). In this case, the same results as in the embodiment of the present invention can also be achieved.

The above describes a case where the destination IP phone 102 obtains the ring tone information from Web server 105. However, the same results as the present embodiment can be achieved by pre-registering the ring tone information corresponding to each telephone number that is assigned to the destination IP phone 102. The following describes the embodiment of the present invention in which such a configuration is applied to the destination IP phone.

Second Embodiment

Figure 12:
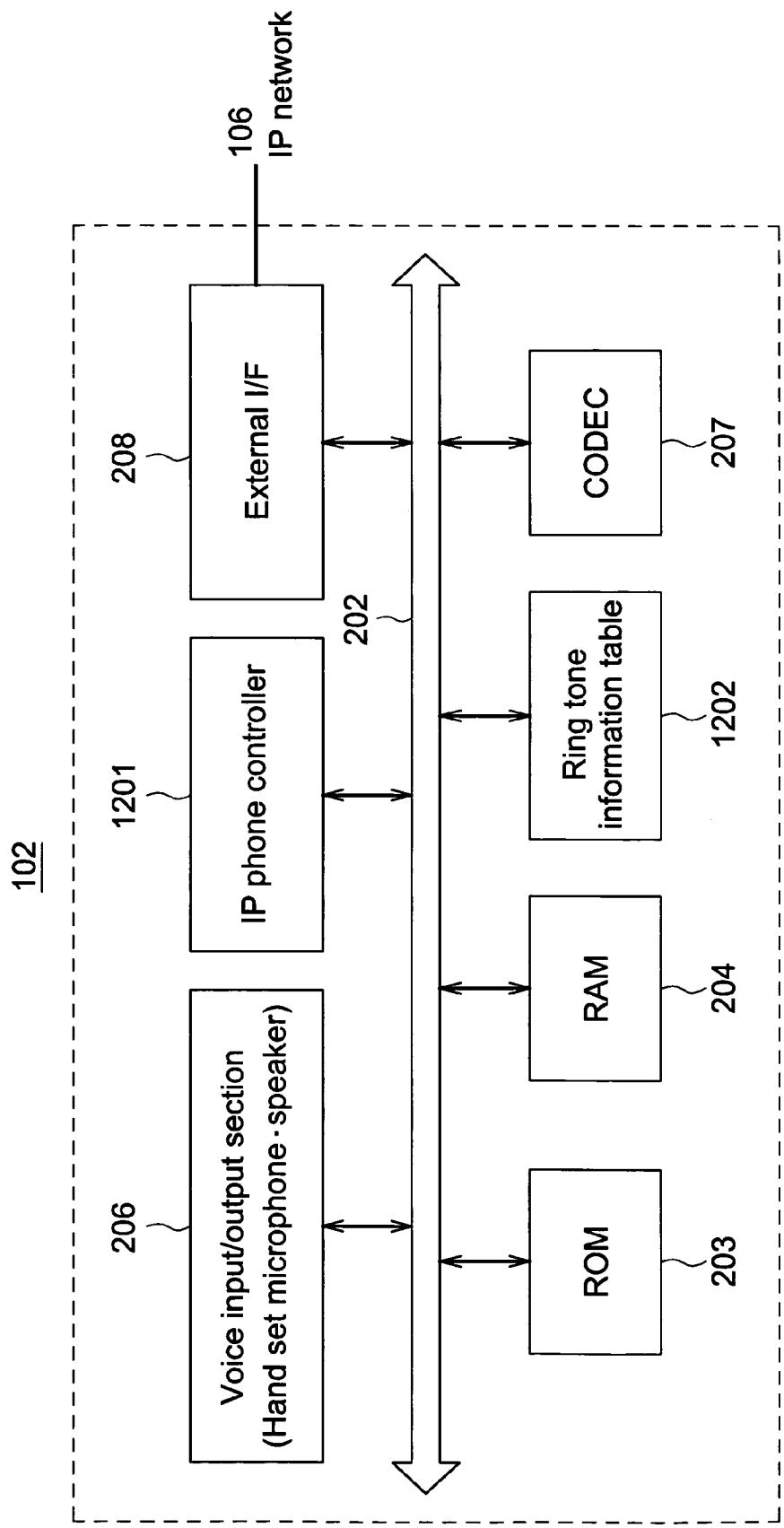
FIG. 12 illustrates a block diagram describing a configuration of an IP telephone apparatus in the IP telephone system according to the second embodiment.

FIG. 12 is a block diagram illustrating a configuration of IP phone 102 according to the second embodiment of the present invention.

IP phone 102 shown in FIG. 12 differs from IP phone 102 in FIG. 2 in that IP phone 102 in FIG. 12 has a table, instead of FROM 205, the table storing ring tone information corresponding to each telephone number that is assigned to IP phone 102 (hereafter referred to as a "ring tone information table"). The address book data in FROM 205 is stored in the ring tone information table. Another difference is that the IP phone controller of IP phone 102 in FIG. 12 has no function to control operations related to Web server 105, but has a function which controls a ring tone according to the ring tone information stored in the ring tone information table. In FIG. 12, components identified with the same numbers as those in FIG. 2 have the same functions, and their descriptions have been omitted.

IP phone controller 1201 has the same functions as IP phone controller 201 shown in FIG. 2 except that IP phone controller 1201 has no function to control access to Web server 105 nor to read HTML texts provided by Web server 105.

IP phone controller 1201 has a function which determines a telephone number corresponding to a URI specified by the source IP phone 101 via IP network 106 and a function which controls the ring tone according to the corresponding telephone number. More specifically, IP phone controller 1201 controls the ring tone by retrieving the telephone number stored in ring tone information table 1202 according to the URI specified by the source IP phone 101, and by setting up the ring tone according to the ring tone that corresponds to the telephone number.

FIG. 13 shows an example of data contained in ring tone information table 1202. FIG. 13 shows a case where two telephone numbers are assigned to IP phone 102.

Ring tone information table 1202 stores URIs, user names and ring tones (ring melodies) corresponding to each telephone number that is assigned to IP phone 102. In FIG. 13, URI "taro@tokyo.sip.jp," user name "taro" and ring melody "Pictures at an Exhibition" corresponding to telephone number "05012341111" are stored. Also, URI "hanako@tokyo.sip.jp," user name "hanako" and ring melody "Polonaise" corresponding to telephone number "05012342222" are stored.

FIG. 14 shows an example of a NAPTR record contained in DB 503 of ENUM server 103 according to the second embodiment of the present invention. FIG. 14 shows a case where DB 503 stores NAPTR records corresponding to domain names obtained from telephone numbers "05012341111" and "05012342222".

In FIG. 14, URI "taro@tokyo.sip.jp" corresponds to domain name "1.1.1.1.4.3.2.1.0.5.1.8.e164.arpa" obtained from telephone number "05012341111". Also, URI "hanako@tokyo.sip.jp" corresponds to domain name "2.2.2.2.4.3.2.1.0.5.1.8.e164.arpa" obtained from telephone number "05012342222".

Figure 15:
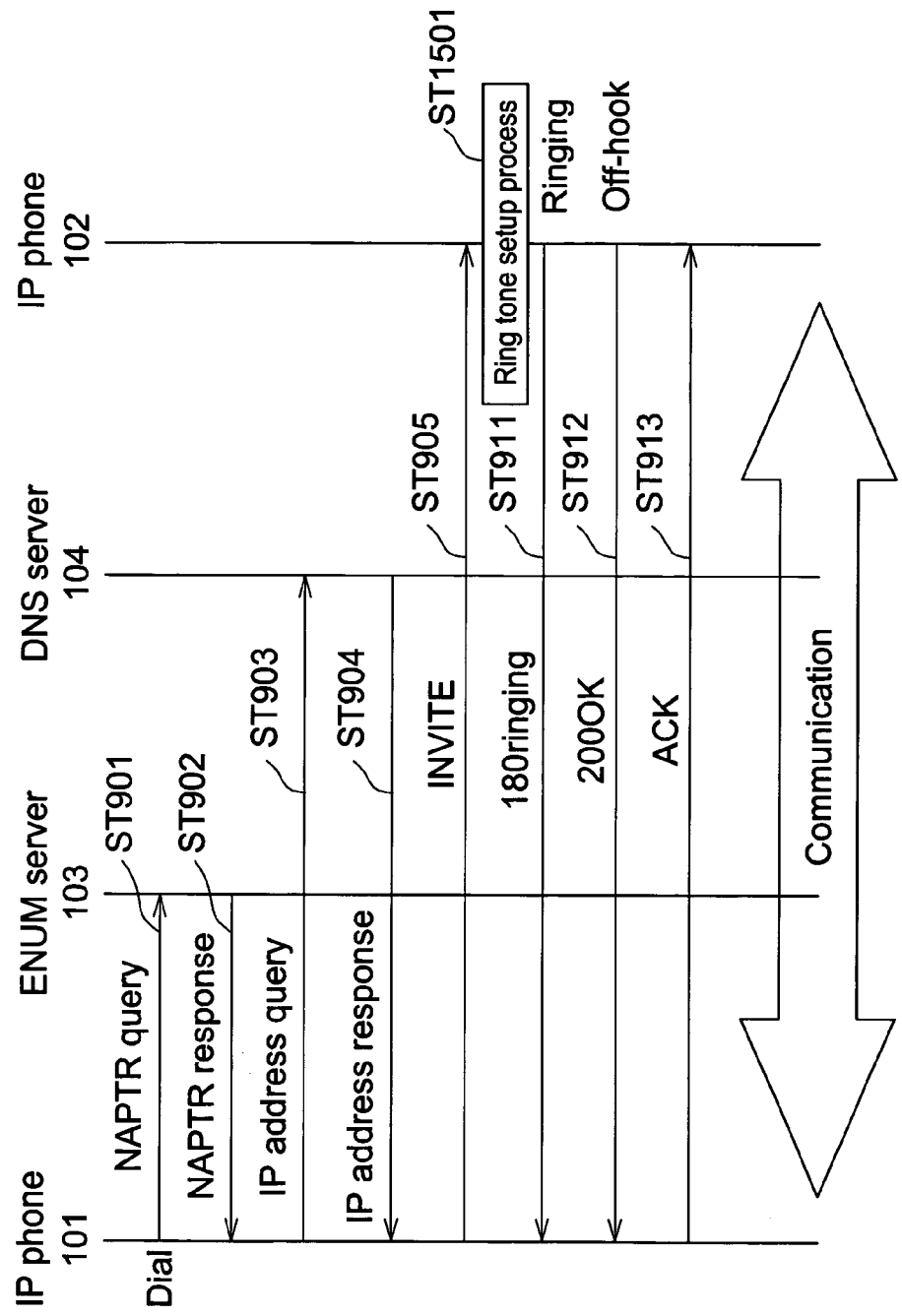
FIG. 15 illustrates a sequence diagram describing operations performed until a source IP telephone apparatus performs voice communication with a destination IP telephone apparatus in the IP telephone system according to the second embodiment.

The following describes the operations performed until IP phone 101 is able to perform voice communication with IP phone 102 in the IP telephone system according to the second embodiment of the present invention with reference to the FIG. 15 sequence. In FIG. 15, the same processes as those in FIG. 9 have the same identifying numbers, and their descriptions have been omitted.

In this illustration, DB 503 of ENUM server 103 stores the NAPTR record shown in FIG. 14, and the DB of DNS server 104 stores the data shown in FIG. 7. Telephone numbers "05012341111" and "05012342222" are assigned to IP phone 102.

The IP telephone system according to the second embodiment of the present invention differs from the IP telephone system according to the first embodiment in that, after receiving the message "INVITE", the destination IP phone 102 performs the ring tone setup process (ST 1501) without obtaining ring tone information from Web server 105. Another difference is that, in the IP telephone system according to the second embodiment of the present invention, the destination IP phone 102 does not perform operations ST 906-ST 909 shown in FIG. 9.

More specifically, when receiving the message "INVITE" from IP phone 101 in ST 905, IP phone 102 confirms the URI specified in header "To" of the message "INVITE". In this example, the data shown in FIG. 10 is transmitted as the message "INVITE". IP phone 102 confirms URI "taro@tokyo.sip.jp" specified in header "To". IP phone 102 then obtains the ring tone corresponding to the confirmed URI from ring tone information table 1202, and performs the ring tone setup process. After the ring tone setup process is performed, IP phone 102 sounds a ringing tone. In this example, IP phone 102 obtains "Pictures at an Exhibition" as the ring tone, and sounds "Pictures at an Exhibition" as the ringing tone.

Figure 16:
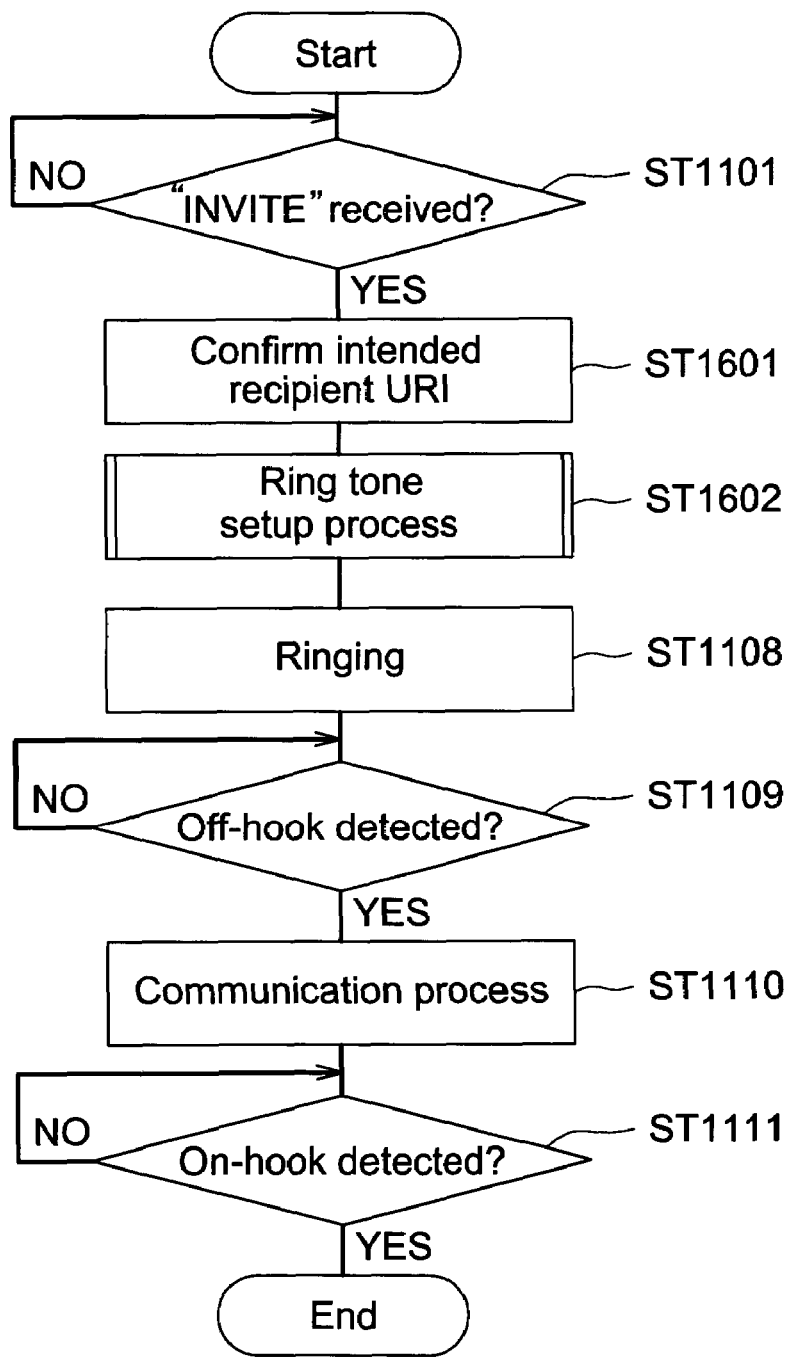
FIG. 16 illustrates a flow chart describing an operation of the destination IP telephone apparatus in the FIG. 15 sequence.

FIG. 16 illustrates a flow chart describing an operation of the destination IP phone 102 in the FIG. 15 sequence. FIG. 16 uses the same numbers as FIG. 11 for the same processes, and their descriptions have been omitted.

When receiving the message "INVITE" in ST 1101 in the IP telephone system according to the second embodiment of the present invention, the destination IP phone 102 confirms the URI specified as the intended recipient in the header "To" (hereafter referred to as an "intended recipient URI") (ST 1601). Then, IP phone 102 obtains the ring tone corresponding to the intended recipient URI from ring tone information table 1202, and performs the ring tone setup process (ST 1602). After this, same as in the first embodiment, after going through the processes ST 1108-ST 1111, IP phone 102 terminates the communication process.

As described above, in the IP telephone system according to the second embodiment of the present invention, the destination IP phone 102 has been assigned a plurality of telephone numbers. The source IP phone 101 specifies one of the telephone numbers and places a call to the telephone number. Then, after receiving the NAPTR response corresponding to the telephone number, the source IP phone 101 transmits the message "INVITE" to the destination IP phone 102. The destination IP phone 102 confirms the intended recipient URI from the message "INVITE". After this, the destination IP phone 102 obtains the ring tone corresponding to the intended recipient URI from ring tone information table 1202. Then, the destination IP phone 102 performs the ring tone setup process and sounds the obtained ring tone. Accordingly, the destination IP phone 102 sounds the ring tone according to the telephone number specified by the source IP phone 101. Therefore, the IP phone 102 user can identify the destination user by the ring tone, and thus, is able to identify the destination user before picking up the phone.

In the flow chart illustrated in FIG. 16, the intended recipient URI described in the message "INVITE" is confirmed in ST 1601, and the ring tone corresponding to the intended recipient URI is obtained from ring tone information table 1202, after which the ring tone setup process is performed in ST 1602. However, a control operation in performing the ring tone setup process based on the description in the message "INVITE" is not limited to this example. For example, the ring tone setup process may also be performed by confirming the user name specified before the "@" mark of the intended recipient URI, which is described in the message "INVITE", and obtaining the ring tone corresponding to this user name from ring tone information table 1202, and performing the ring tone setup process. In such modified case, the same results as in the first embodiment can also be achieved.

In the IP telephone system according to the present invention, the voice is not limited to the human voice. It may also include sounds in general, for example, modern signals modulated to voice bands and fax signals. Also, the telephone can be a fax apparatus as well.

Furthermore, in the IP telephone system according to the present embodiment, the IP telephone is described as a single device. However, it is not limited to this embodiment. In other words, the IP telephone can be configured by connecting an ordinary telephone apparatus to a control adapter that has a function which uses the connected ordinary telephone apparatus as an IP telephone. In this illustration, the ordinary telephone apparatus is a telephone apparatus that has no voice communication functions via IP network 106.

The IP telephone described above includes an IP telephone defined by the government and operated by a telecommunications provider. It also includes an IP telephone provided on a local network or a private network using TCP/IP or other computer network protocols.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

This application is based on the Japanese Patent Application No. 2004-220536 filed on Jul. 28, 2004, entire content of which is expressly incorporated by reference herein.

What is claimed is:

1. An IP telephone system comprising:
   an IP (Internet Protocol) telephone apparatus that is connected to an IP network;
   a Web server that stores ring tone information corresponding to a telephone number assigned to said IP telephone apparatus, and transmits, to said IP telephone_apparatus, the ring tone information in response to a request from said IP telephone apparatus; and
   an ENUM (Telephone Number Mapping) server that stores a NAPTR (Naming Authority Pointer) resource record in which a URI (Uniform Resource Identifier) specifies link data related to the ring tone information that is stored in said Web server, and transmits, to said IP telephone apparatus, the NAPTR resource record in response to a query from said IP telephone apparatus, the link data linking the NAPTR resource record stored in the ENUM server with the ring tone information stored in said Web server,
   wherein said IP telephone apparatus, when a call is received, transmits, to said ENUM server, a query for a NAPTR resource record associated with an intended recipient telephone number, transmits, to said Web server, a request for the ring tone information corresponding to the intended recipient telephone number, associated with the obtained NAPTR resource record, and sounds a ring tone based upon the obtained ring tone information.

2. The IP telephone system according to claim 1, wherein an http protocol is specified in the NAPTR resource record stored in said ENUM server, and when the call is received, said IP telephone apparatus transmits, to said Web server, a request for the ring tone information corresponding to the intended recipient telephone number according to the http protocol.

3. The IP telephone system according to claim 1, wherein when the call is received, said IP telephone apparatus obtains the intended recipient telephone number based on a description of a received INVITE message.

4. An IP (Internet Protocol) telephone apparatus connected to a Web server and an ENUM (Telephone Number Mapping) server, the Web server storing ring tone information corresponding to a telephone number assigned to an IP telephone apparatus on an IP network, the ENUM server storing a NAPTR (Naming Authority Pointer) resource record in which a URI (Uniform Resource Identifier) specifies link data related to the ring tone information that is stored in the Web server, the link data linking the NAPTR resource record stored in the ENUM server with the ring tone information stored in said Web server, the IP telephone apparatus comprising:
  a query unit that transmits, to the ENUM server, a query for a NAPTR resource record associated to an intended recipient telephone number, when receiving a call from another IP telephone apparatus on the IP network;
  a requester that transmits, to the Web server, a request for the ring tone information corresponding to the intended recipient telephone number associated with the obtained NAPTR resource record; and
  a sound unit that sounds a ring tone based on the obtained ring tone information.

5. The IP telephone apparatus according to claim 4, wherein said requester transmits, to the Web server, a request for the ring tone information corresponding to the intended recipient telephone number according to an http protocol, the http protocol being specified in the NAPTR resource record stored in the ENUM server.

6. The IP telephone apparatus according to claim 4, wherein said query unit transmits a query for the NAPTR resource record according to the intended recipient telephone number obtained based on a description of the INVITE message, the INVITE message being received from another IP telephone apparatus.

7. A method for identifying a destination using an IP (Internet Protocol) telephone apparatus, the IP telephone apparatus being connected to a Web server and an ENUM (Telephone Number Mapping) server, the Web server storing ring tone information corresponding to a telephone number assigned to an IP telephone apparatus on an IP network, the ENUM server storing a NAPTR (Naming Authority Pointer) resource record in which a URI (Uniform Resource Identifier) specifies link data related to the ring tone information, the information being stored in the Web server, the link data linking the NAPTR resource record stored in the ENUM server with the ring tone information stored in said Web server, the method comprising:
  transmitting, to the ENUM server, a query for a NAPTR resource record associated with an intended recipient telephone number, when a call is received from another IP telephone apparatus on the IP network;
  transmitting, to the Web server, a request for the ring tone information corresponding to the intended recipient telephone number associated with the obtained NAPTR resource record; and
  sounding a ring tone based on the obtained ring tone information.

8. The method for identifying a destination user according to claim 7, wherein the transmitting to the Web server comprises transmitting the request or the ring tone information corresponding to the intended recipient telephone number according to an http protocol, the http protocol being specified in the NAPTR resource record stored in the ENUM server.

9. The method for identifying a destination user according to claim 7, wherein the intended recipient telephone number is obtained based on a description of the INVITE message, the INVITE message being received from another IP telephone apparatus.

10. An IP telephone system comprising:
  a destination IP (Internet Protocol) telephone apparatus to which a plurality of telephone numbers are assigned and that stores a URI (Uniform Resource Identifier) and distinct ring tone information corresponding to each of the plurality of the telephone numbers assigned to the destination IP telephone apparatus;
  an ENUM (Telephone Number Mapping) server that stores a NAPTR (Naming Authority Pointer) resource record specifying the URI corresponding to each of the plurality of the telephone numbers assigned to said destination IP telephone apparatus; and
  a source IP telephone apparatus that transmits, to said ENUM server, a query for a the NAPTR resource record by specifying one of the plurality of the telephone numbers assigned to the destination IP telephone apparatus, that obtains from said ENUM server, the NAPTR resource record in response to the query, the NAPTR resource record specifying a URL and that accesses said destination IP telephone apparatus for a call via an IP network based on the URI specified in the obtained NAPTR resource record,
  wherein said destination IP telephone apparatus sounds a ring tone based upon the ring tone information corresponding to the URI specified by the source IP telephone apparatus.

11. A method for identifying a destination user using a destination IP (Internet Protocol) telephone apparatus that is connected to an ENUM (Telephone Number Mapping) server, a plurality of telephone numbers being assigned to the destination IP telephone apparatus, the destination IP telephone apparatus storing a URI (Uniform Resource Identifier) and distinct ring tone information corresponding to each of the plurality of the telephone numbers assigned to the destination IP telephone apparatus, the ENUM server storing a NAPTR (Naming Authority Pointer) resource record that specifies a URI corresponding to one of the plurality of the telephone numbers assigned to an the destination IP telephone apparatus on an IP network, the method comprising:
  transmitting, from a source IP telephone apparatus to the ENUM server, a query for the NAPTR resource record by specifying one of the plurality of the telephone numbers assigned to the destination IP telephone apparatus, the NAPTR resource record specifying a URI;
  obtaining, at the source IP telephone apparatus, from the ENUM server, the NAPTR resource record in response to the query;
  accessing the destination IP telephone apparatus for a call via an IP network based on the URI specified in the obtained NAPTR resource record; and
  sounding, at the destination IP telephone apparatus, a ring tone based upon the ring tone information corresponding to the URI specified by the source IP telephone apparatus.

* * * * *